US011838397B2

(12) United States Patent
Konigsburg (10) Patent No.: US 11,838,397 B2
(45) Date of Patent: Dec. 5, 2023

(54) SYSTEMS AND METHODS FOR SYNCHRONIZATION OF PROCESSING ELEMENTS

(71) Applicant: Brian R. Konigsburg, Pasadena, MD (US)

(72) Inventor: Brian R. Konigsburg, Pasadena, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 285 days.

(21) Appl. No.: 17/350,758

(22) Filed: Jun. 17, 2021

(65) Prior Publication Data

US 2022/0407675 A1 Dec. 22, 2022

(51) Int. Cl.
*H04L 7/00* (2006.01)

(52) U.S. Cl.
CPC .......... *H04L 7/0016* (2013.01); *H04L 7/0004* (2013.01); *H04L 7/0079* (2013.01)

(58) Field of Classification Search
CPC .... H04L 7/0016; H04L 7/0004; H04L 7/0079
See application file for complete search history.

(56) References Cited

U.S. PATENT DOCUMENTS

2016/0020759 A1 1/2016 Bryan et al.
2022/0222200 A1* 7/2022 Mishra ................ G06F 13/4291

FOREIGN PATENT DOCUMENTS

EP 3486780 A1 5/2019
WO 2008/135305 A1 11/2008

OTHER PUBLICATIONS

Extended European Search Report (EESR) dated Oct. 5, 2022 for corresponding EP 22171275.5-1213.

* cited by examiner

*Primary Examiner* — Elton Williams
(74) *Attorney, Agent, or Firm* — Tarolli, Sundheim, Covell & Tummino L.L.P.

(57) ABSTRACT

In an example, a synchronization signal can be transmitted to a plurality of synchronizers. The plurality of synchronizers can include a plurality of upstream synchronizers and a downstream synchronizer. Each synchronizer of the plurality of upstream synchronizers can be caused to count from a respective count value until a predetermined end count sequence value in response to receiving the synchronization signal. The respective count value stored at each synchronizer can be representative of a difference in time between a respective upstream synchronizer of the plurality of upstream synchronizers receiving the synchronization signal and the downstream synchronizer receiving the synchronization signal. A respective processing element of a plurality of processing elements can be caused to start a respective function or operation in response to a respective upstream synchronizer reaching the predetermined end count sequence value.

19 Claims, 4 Drawing Sheets

SYSTEMS AND METHODS FOR SYNCHRONIZATION OF PROCESSING ELEMENTS

GOVERNMENT INTEREST

The invention was made under Government Contract. Therefore, the US Government has rights to the invention as specified in that contract.

TECHNICAL FIELD

The present disclosure relates to systems and methods for synchronization of processing elements.

BACKGROUND

Synchronization is the coordination of events to operate a system or a device in unison. Systems that operate with all parts in synchrony are said to be synchronous or in sync, and those that are not are asynchronous. Systems or devices are sometimes synchronized to make events at points far apart appear simultaneous or near-simultaneous from a certain perspective. Synchronization is used in various technical fields, including computer science (e.g., parallel computing, such as coordination of threads or processes to complete a task), cryptography, lip-sync, multimedia, telecommunications, etc.

SUMMARY

In an example, a method can include transmitting a synchronization signal to a plurality of synchronizers. The plurality of synchronizers can include a plurality of upstream synchronizers and a downstream synchronizer. The method can further include causing each synchronizer of the plurality of upstream synchronizers to count from a respective count value until a predetermined end count sequence value in response to receiving the synchronization signal. The respective count value can be stored at each synchronizer and can be representative of a difference in time between a respective upstream synchronizer of the plurality of upstream synchronizers receiving the synchronization signal and the downstream synchronizer receiving the synchronization signal. The method can further include causing a respective processing element of a plurality of processing elements to start a respective function or operation in response to a respective upstream synchronizer reaching the predetermined end count sequence value.

In another example, a system can include a sync signal generator that can be configured to generate and transmit a synchronization signal for synchronization of a plurality of processing elements. The system further can include a plurality of synchronizers. Each processing element of the plurality of processing elements can include a respective synchronizer of the plurality of synchronizers. Each of the plurality of synchronizers can be configured to count from different count values until a predetermined end count sequence value in response to receiving the synchronization signal. The plurality of synchronizers can be configured to cause respective processing elements of the plurality of processing elements to start a respective function or operation in response to a respective synchronizer reaching the predetermined end count sequence value.

In a further example, a system can include a sync signal generator that can be configured to generate and transmit a synchronization signal for synchronization of processing elements. The system can include a plurality of sets of synchronizers. Each respective synchronizer of each set of synchronizers can be part of a processing element of a plurality of processing elements. The plurality of processing elements can include sets of processing elements that can be arranged to form a respective processing element zone. Each respective synchronizer can be configured to count from a different count value than other synchronizers until a predetermined end count sequence value in response to receiving the synchronization signal, and cause a corresponding processing element that includes the respective synchronizer to start a respective function or operation in response to the respective synchronizer reaching the predetermined end count sequence value.

DETAILED DESCRIPTION

The present disclosure relates to systems and methods for synchronization of processing elements. While many examples are presented herein for synchronizing a functionality or operation of processing elements, the examples herein should not be construed and/or limited to only processing elements. Thus, the systems and methods described herein can be used in any technical environment that may require synchronization of systems (e.g., devices, apparatuses, circuits, etc.), such that the systems can start or initiate a function or operation at a substantially similar point in time (or on a same clock cycle of a clock signal). For example, an array of processing elements of a processing device or system, such as an integrated circuit (IC), a system on chip (SoC), or another type of die are often designed to operate in concert and thus are synchronized to perform respective functions or operations based on inputted data. In some examples, to synchronize the array of processing elements, a balanced tree is used to ensure that each processing element receives a synchronization signal at about the same time as other processing elements of the array of processing elements. Because each of the processing elements receives the synchronizations at about the same time, the processing elements can perform a respective function or operation in sync with each other.

Using balanced tree synchronization is resource-intensive and requires a large number of gates and wires to be used. However, as the number of processing elements increases, the number of gates and wires that can be used or employed is limited by an available area for such elements on the processing device. Moreover, in some instances, balance tree synchronization requires a dedicated bus, which may be impractical for transmitting other types of information that may require a larger bus (e.g., a greater bus width). Moreover, in some instances, using balanced trees with latches for synchronization can result in non-uniform signal latching, or require a large proliferation of latches for upstream nodes to match latches of downstream nodes. In some instances, an H-type balance tree can be used with balanced loading and delays to achieve an absolute time reference for each processing element. However, these alternatives can be cost-prohibitive and limit the compactness of the processing device.

Examples are presented herein for synchronizing processing elements, such that the processing elements can operate in concert and thus can be synchronized to perform a respective function or operation for which each processing element was designed to perform. According to the systems and methods described herein, processing elements can be synchronized without using a balanced tree for signal distribution as in other approaches. Thus, the systems and methods described herein can improve the area and performance of the processing device by eliminating balanced tree hardware (e.g., gate, wires, etc.). Moreover, by using the systems and methods described herein, data tagging and/or storage of data in queues until process elements are synchronized can be eliminated as the data can read without any additional information since the process elements can be configured to initiate function or operations at about a similar instance in time.

By way of example, a synchronization system can include a sync signal generator and synchronizers. In some examples, each synchronizer can be employed as a part of a processing element of processing elements. The sync signal generator can be configured to transmit a synchronization signal that can be received by each of the synchronizers. The synchronization signal can arrive at each synchronizer at a different instance in time since being transmitted as each synchronizer can be located at a different distance away from the sync signal generator. Each respective synchronizer can be configured to count from a respective count value until a predetermined end count sequence value in response to receiving the synchronization signal. The respective count value for each respective synchronizer can be representative of a difference in time between a respective synchronizer located upstream from a last synchronizer receiving the synchronization signal and the last synchronizer receiving the synchronization signal. The last synchronizer can be located the farthest away from the sync signal generator relative to the other synchronizers of the synchronizers. Each respective processing element can be configured to start a respective function or operation at about a similar instance in time in response to a corresponding synchronizer reaching the predetermined end count sequence value. Accordingly, the synchronization system can synchronize operations or functions of processing elements without the use of a balanced tree as in other approaches.

Figure 1:
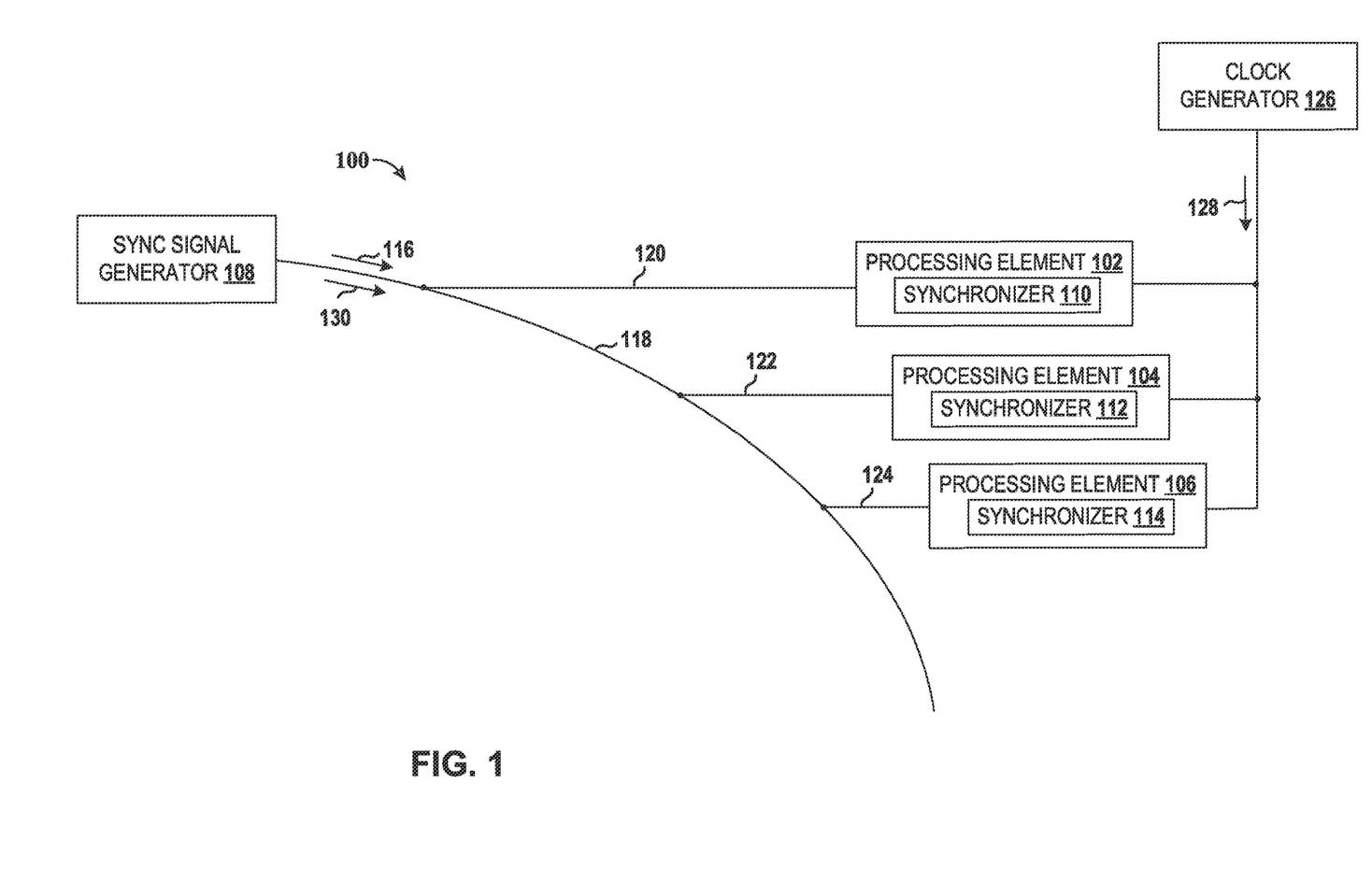
FIG. 1 is an example of a system for synchronizing processing elements.

FIG. 1 is an example of a synchronization system 100 for synchronizing processing elements 102, 104, and 106. While the example of FIG. 1 shows three (3) processing elements 102, 104, and 106 being synchronized, in other examples, more than three (3) processing elements (e.g., hundreds, thousands, millions, or more processing elements) may be synchronized according to the examples described herein. The term "processing element" as used herein can refer to a circuit (e.g., an adder circuit, a division circuit, a register circuit, a buffer circuit, a combinational circuit, and another type of circuit), a functional unit, a hardware engine, a controller, a processor, a central processing unit (CPU), a graphical processing unit (GPU), an accelerator (e.g., a field programmable array (FPGA) device, a tensor processor unit, a vector processor unit, a machine learning accelerator, a purpose build accelerator solution and another type of workload accelerator), a processing system (e.g., a weather data processing system, or any other type of data processing system), a device, or any element that may require respective actions to be synchronized with actions of another element. In some examples, the synchronization system 100 can be used to synchronize an array of processing elements that may be arranged in a two-dimensional (2-D) or three-dimensional (3-D) pattern arrangement.

In some examples, the processing elements 102, 104, and 106 can be coordinated to implement a respective function or operation. For example, the processing elements 102, 104, and 106 can be coordinated to implement a data processing function or operation. In some examples, the processing elements 102, 104, and 106 can be coordinated to implement a collective function or operation (e.g., parallel processing). Thus, the synchronization system 100 can be employed to synchronize actions of the processing elements 102, 104, and 106. The phrase "synchronize actions" and its derivatives as used herein can refer to coordinating one or more operations or functions of processing elements, such that the one or more operations or functions are implemented by the processing elements over a similar period of time (e.g., on a similar clock cycle or within a given amount of clock cycles), or at about a same time. In some examples, the synchronization system 100 can synchronize the processing elements 102, 104, and 106 to start executing the respective function or operation on a same or similar clock cycle of a clock signal.

For example, to synchronize actions of the processing elements 102, 104, and 106, the synchronization system 100 can include a sync signal generator 108. In some examples, the synchronization system 100 can employ a respective synchronizer 110, 112, and 114. Each of the processing elements 102, 104, and 106 can include one of the synchronizers 110, 112, and 114. In other examples, each processing element 102, and 104, and 106 can be coupled to one of the synchronizers 110, 112, 114. The sync signal generator 108 can be configured to generate a synchronization signal 116.

The synchronization signal 116 can be provided to a main communication channel 118 to which the sync signal generator 108 can be coupled. Each processing element 102, 104, and 106 can be coupled to the main communication channel 118 via a respective branch communication channel 120, 122, and 124. Each communication channel 118, 120, 122, and 124 can be representative of a path over which the synchronization signal 116 can be transmitted. In some examples, each communication channel 118, 120, 122, and 124 can be a transmission line, such as a copper line, an optical line, a trace, a wire, or another type of communication path. In other examples, the main communication channel 118 can be omitted and each of the branch communication channels 120, 122, and 124 can be coupled to the sync signal generator 108 to receive a respective synchronization signal 116, which can be transmitted by the sync signal generator 108 over the respective branch communication channel 120, 122, and 124 at about the same time. In further examples, the sync signal generator 108 can include a transmitter, and each of the synchronizers 110, 112, and 114 can include a receiver for receiving the synchronization signal 116. Thus, in some examples, the sync signal generator 108 can communicate with each processing element 102, 104, and 106 over a wireless communication channel, such as a radio frequency (RF) channel, an infrared channel, or another type of wireless communication channel. Thus, in some examples, the synchronization signal 116 may be an RF or an optical signal.

By way of further example, each of the synchronizers 110, 112, and 114 can be configured to receive the synchronization signal 116. Each of the synchronizers 110, 112, and 114 can be configured to store a respective count value that can be determined before an operation of the synchronization system 100. For example, each of the synchronizers 110, 112, and 114 can be configured to count from the respective count value for a predetermined amount of time. In some examples, each of the synchronizers 110, 112, and 114 can be configured to count from a different count value for a different predetermined amount of time. Upon reaching an end of a counting sequence, each of the synchronizers 110, 112, and 114 can be configured to cause a respective processing element 102, 104, and 106 to initiate (or perform) a function or operation at about a same instance in time (e.g., within a given amount of time). Accordingly, each of the synchronizers 110, 112, and 114 can be configured to command a respective one of the processing elements 102, 104, and 106 to operate in sync with each other.

In some examples, a clock generator 126 can be configured to provide a clock signal 128. Thus, in other examples, each of the synchronizers 110, 112, and 114 can be configured to store a respective count value representative of a number of edges of the clock signal 128 or a number of clock cycles of the clock signal 128. Each of the synchronizers 110, 112, and 114 can be configured to track (e.g., count) a number of clock cycles of the clock signal 128 that has elapsed since receiving the clock signal 128. Each of the synchronizers 110, 112, and 114 can be configured to cause a respective processing element 102, 104, and 106 to initiate (start) the respective function or operation in response to determining that the number of clock cycles of the clock signal 128 counted since receiving the clock signal 128 is equal to the respective count value. By way of example, each of the synchronizers 110, 112, and 114 can be configured to count a number of edges (e.g., rising and/or falling edges) of the clock signal 128 since receiving the clock signal 128. In response to determining that the number of edges of the clock signal 128 counted since receiving the clock signal 128 is equal to the respective count value, each of the synchronizers 110, 112, and 114 can be configured to cause the respective processing element 102, 104, and 106 to initiate the respective function or operation.

In some examples, each of the synchronizers 110, 112, and 114 can be configured to store a corresponding count value that can be determined prior to the operation of the synchronization system 100. In some examples, the corresponding count value being stored at each respective synchronizer 110. 112, and 114 can be representative of a difference in time between an upstream synchronizer receiving the synchronization signal 116 and a downstream synchronizer receiving the synchronization signal. The downstream synchronizer can be located the farthest away from the sync signal generator 108 in comparison to one or more upstream synchronizers. The synchronizer that is located the farthest away from sync signal generator 108 can be referred to herein as "a downstream synchronizer." Because in the example of FIG. 1 the synchronizer 114 is positioned the farthest away from the sync signal generator 108 the synchronizer 114 can be referred to herein as the downstream synchronizer. In contrast, synchronizers that are located closer to the sync signal generator 108 than the downstream synchronizer can be referred to herein as "upstream synchronizers." Because in the example of FIG. 1 the synchronizers 110 and 112 are positioned closer to the sync signal generator 108 than the synchronizer 114 these synchronizers can be referred to as upstream synchronizers.

In some examples, the synchronization signal 116 arrives at each synchronizer 110, 112, and 114 at a different instance in time since being transmitted (or communicated) by the sync signal generator 108. To ensure that the processing elements 102, 104, and 106 start the function or operation at about the same time, each of synchronizers 110, 112, and 114 can be configured to command the respective one of the processing elements 102, 104, and 106 to start the function or operation based the corresponding stored count value therein.

For example, the synchronizer 110 can store a first count value representative of a difference in time between the synchronizer 110 receiving the synchronization signal 116 and the synchronizer 114 receiving the synchronization signal 116. The synchronizer 110 can be configured to count down or up from the first count value until a predetermined end count sequence value (e.g., zero). The synchronizer 110 can be configured to cause the processing element 102 to start the respective function or operation in response to reaching the predetermined end count sequence value. In some examples, the synchronizer 112 can store a second count value representative of a difference in time between the synchronizer 112 receiving the synchronization signal 116 and the synchronizer 114 receiving the synchronization signal 116. The synchronizer 112 can be configured to count down or up from the second count value until the predetermined end count sequence value (e.g., zero). The synchronizer 112 can be configured to cause the processing element 104 to start the respective function or operation in response to reaching the predetermined end count sequence value.

In some examples, the synchronizer 114 can store a third count value. Because the synchronizer 114 is the downstream synchronizer, the third count value can be representative of the predetermined end count sequence value (e.g., zero). Thus, stated differently, the third count value can be representative of a difference in time between the synchronizer 114 receiving the synchronization signal 116 and the synchronizer 114 receiving the synchronization signal 116. The synchronizer 114 can be configured to count from the third count value until the predetermined end count sequence value (e.g., zero). The synchronizer 114 can be configured to cause the processing element 106 to start the respective function or operation in response to reaching the predetermined end count sequence value. Accordingly, the synchronizer 114 can cause the processing element 106 to start the respective function or operation function at about the same time as the respective synchronizers 110 and 112 command respective processing elements 102 and 104 to start their respective function or operation function.

Accordingly, by configuring synchronizers for processing elements with a corresponding count value representative of a difference in time between a respective upstream synchronizer receiving a synchronization signal and the downstream synchronizer receiving the synchronization signal, each respective processing element can be configured to start their respective function or operation function at about the same instance in time (e.g., in synchrony). The synchronization system 100 enables each of the processing elements 102, 104, and 106 to stair the respective function or operation at about the same instance in time even though each of the synchronizers 110, 112, and 114 sees the (same) synchronization signal 116 at different instances in time.

In some examples, a count value stored at each of the synchronizers 110, 112, and 114 can be determined (or computed) based on a simulation of the synchronization system 100. For example, a simulator (e.g., simulation software) can be programmed to simulate the synchronization system 100 in a simulation environment (e.g., on a simulated processing device, such as an IC) to determine a respective count value for each of the synchronizers 110, 112, and 114. For example, during the simulation, a signal timing engine can be programmed to determine an amount of time that it takes a simulated synchronization signal to travel from a simulated sync generator to each simulated synchronizer. The signal timing engine can be programmed to compute the respective count value for each of the synchronizers 110, 112, and 114 based on the amount of time that it takes the simulated synchronization signal to travel from the simulated sync generator via simulated channels (e.g., of the main channel 118 and respective branch channel 120, 122, and 124) to a respective simulated synchronizer.

In other examples, the sync signal generator 108 can be configured to generate a count determination signal 130. The count determination signal 130 can include a respective timestamp indicative of a time at about which the count determination signal was generated by the sync signal generator 108. Each of the synchronizers 110, 112, and 114 can be configured to receive the count determination signal 130. The synchronizer 110 can compare the timestamp relative to a time at which the synchronizer 110 received the count determination signal 130 to determine a first time difference value. The synchronizer 112 can compare the timestamp relative to a time at which the synchronizer 112 received the count determination signal 130 to determine a second time difference value. The synchronizer 114 can compare the timestamp relative to a time at which the synchronizer 114 received the count determination signal 116 to determine a third time difference value.

By way of further example, each of the synchronizers 110, 112, and 114 can be configured to communicate a respective time difference value to the sync signal generator 108. For example, each of the synchronizers 110, 112, and 114 can be coupled to the sync signal generator 108 via a respective communication channel (not shown in FIG. 1) over which the respective time difference value can be communicated (e.g., as a signal). The sync signal generator 108 can be configured to determine the first time count value for the synchronizer 110 based on a difference between the first time difference value and the third time difference value. For example, if the first time difference value is 10 and the third time difference value is 30, the first time count value can be 20 (e.g., 30−10=20). The sync signal generator 108 can be configured to determine a second time count value based on a difference between the second time difference value and the third time difference value.

For example, if the second time difference value is 20 and the third time difference value is 30, the second time count value can be 10 (e.g., 20−10=10). The sync signal generator 108 can be configured to determine the third time count value based on a difference between the third time difference value and the third time difference value. The sync signal generator 108 can be configured to transmit the first, second, and third time count values to each respective synchronizer 110, 112, and 14 via a corresponding communication channel over which the respective time difference value was communicated (or a different respective communication channel that couples the sync signal generator 108 to the synchronizers 110, 112, and 114). Accordingly, the synchronization system 100 can be used to synchronize the processing elements 102, 104, and 106, such that the processing elements 102, 104, and 106 can start the function or operation at about the same time.

Figure 2:
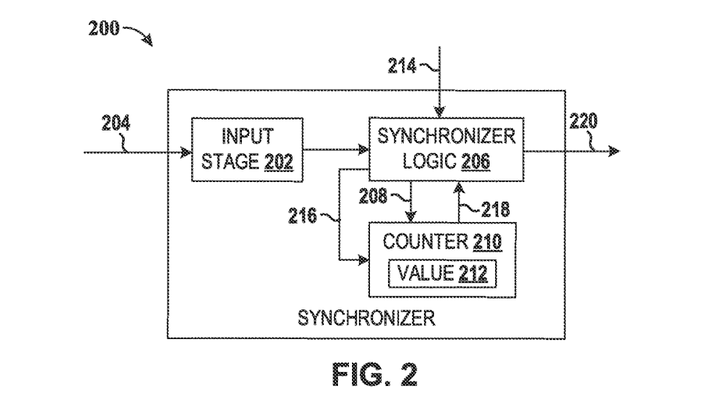
FIG. 2 is an example of a synchronizer.

FIG. 2 is an example of a synchronizer 200. The synchronizer 200 can correspond to one of the synchronizers 110, 112, and 114, as shown in FIG. 1. Therefore, the following description of FIG. 2 can also refer to FIG. 1. The synchronizer 200 can be implemented in software, hardware, and/or as a combination of hardware and software. In some examples, the synchronizer 200 can include an input stage 202. The input stage 202 can be configured to receive a synchronization signal 204. The synchronization signal 204 can correspond to the synchronization signal 116, as shown in FIG. 1. Thus, the synchronization signal 204 can be generated by the sync signal generator 108, as shown in FIG. 1. In some examples, the input stage is a field effect transistor (FET). A gate of the FET can be coupled to an input node of the synchronizer at which the synchronization signal 204 can be received. The synchronization signal 204 can drive the gate to cause the FET to output a signal (e.g., at a drain of the FET) to synchronizer logic 206 of the synchronizer 200. In some examples, the input stage 202 can be omitted and the synchronization signal 204 can be provided to the synchronizer logic 206. In further examples, the input stage 202 can be configured to provide the synchronization signal 204 to the synchronizer logic 206.

In some examples, the synchronizer logic 206 can be representative of a controller that can include memory with machine readable instructions for implementing a synchronization application. For example, the synchronization application can be programmed to cause a respective processing element (e.g., the processing element 102, as shown in FIG. 1) to start a function or operation at about a same time as one or more other processing elements (e.g., processing elements 104 and 106, as shown in FIG. 1). The one or more other processing elements can employ a synchronizer that can operate in a same or similar manner as the synchronizer 200 (but with a different count value, as described herein) to synchronize an operation or function with the respective processing element.

By way of example, the synchronizer logic 206 can be configured to generate a counter initialization signal 208 based on the synchronization signal 204. For example, the synchronizer logic 206 can generate the counter initialization signal 208 in response to receiving a signal from the input stage. The synchronizer 200 can include a counter 210. The counter 210 can be implemented in hardware, software, or a combination thereof. In some examples, the counter 210 can be implemented as a down counter. The counter 210 can be programmed with a counter value 212. The counter 210 can be configured to count down from the counter value 212 until another pre-set value or zero value is reached. For example, the counter 210 can be configured to count down from the count value 212 to the pre-set value or the zero value in response to receiving the counter initialization signal 208.

In some examples, to program the counter 210 with the counter value 212, the synchronizer logic 206 can be configured to receive a counter programming signal 214. In some examples, the counter programming signal 214 can be provided by the sync signal generator 108, as shown in FIG. 1. The counter programming signal 214 can characterize the counter value 212. In some examples, the counter value 212 can be determined according to the examples described herein. In other examples, a different approach can be used to compute the counter value 212. The synchronizer logic 206 can generate a set count value signal 216 for setting the counter 210 to the count value identified by the counter programming signal 214. Thus, the counter 210 can be programmed with a predetermined count value from which the counter 210 is to count down from in response to receiving the counter initialization signal 208. In other examples, the counter 210 can be provided with the predetermined count value.

In some examples, the counter 210 can be configured to output a count reached signal 218 in response to reaching an end of a counting sequence. The synchronizer logic 206 can be configured to output an activation signal 220 in response to receiving the count reached signal 218. The activation signal 220 can be provided to a controller (e.g., microcontroller, processor, etc.) of the respective processing element to initiate (or start) a function or operation of the respective processing element. Accordingly, the synchronizer 200 can be employed in the respective processing element to synchronize actions of the respective processing element with the one or more other processing elements.

Figure 3:
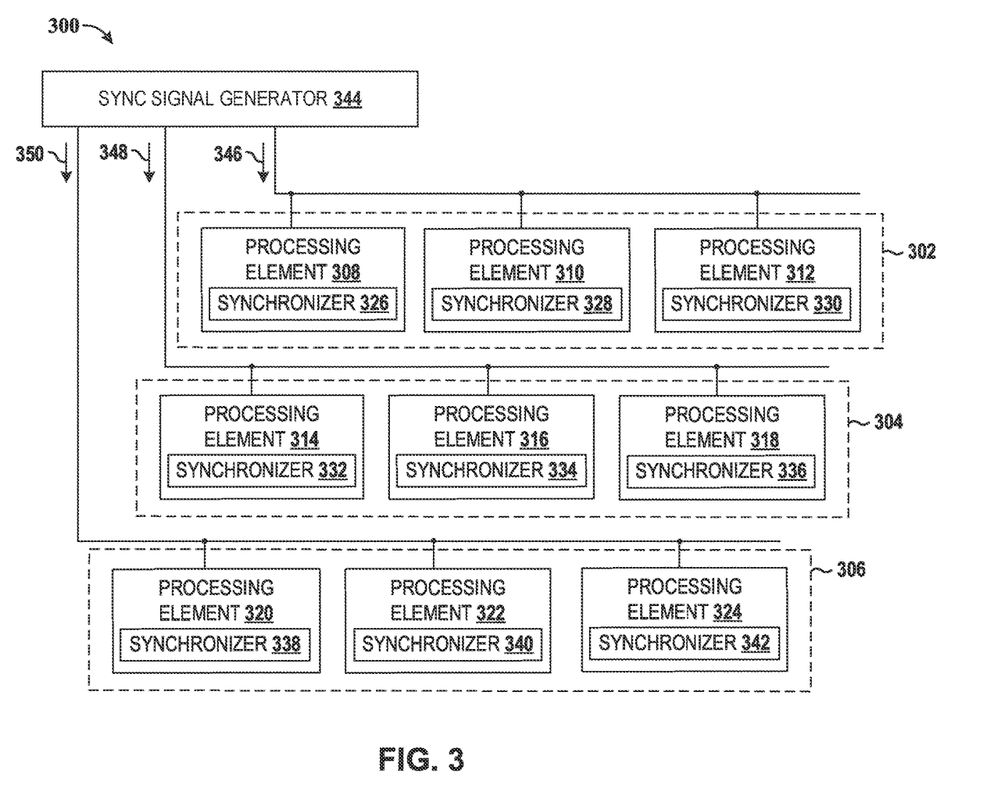
FIG. 3 is an example of a system with synchronized processing element zones.

FIG. 3 is an example of a system 300 with processing element zones 302, 304, and 306. While the example of FIG. 3 illustrates three (3) processing element zones in other examples more or less than three (3) processing element zones can be employed. In the example of FIG. 3, each of the processing element zones 302, 304, and 306 can include a plurality of processing elements that can be zone synchronized to initiate or start a respective function or operation at about the same time. In some examples, each of the processing element zones 302, 304, and 306 can be configured to operate in sync to solve or handle a task.

By way of example, the first processing element zone 302 includes a first set of processing elements 308, 310, and 312. The second processing element zone 304 can include a second set of processing elements 314, 316, and 318. The third processing element zone 308 can include a third set of processing elements 320, 322, and 324. As an example, the first set of processing elements 308, 310, and 312 can be a first set of logical circuits (e.g., adder circuits), the second set of processing elements 314, 316, and 318 can be a second set of logical circuits (e.g., subtractor circuits), and the third set of processing elements 320, 322, and 324 can be a third set of logical circuits (e.g., comparator circuits). In some examples, respective processing elements of a corresponding processing element zone may provide data to one or more other processing elements for executing a function or operation based on the data.

Continuing with the example of FIG. 3, each of the processing elements of each processing element zone can include a synchronizer that can be configured to operate in a same or similar manner as one of the synchronizers 110, 112, and 114, as shown in FIG. 1, or the synchronizer 200, as shown in FIG. 2. Therefore, the following description of FIG. 3 can also refer to FIGS. 1-2. For example, the first set of processing elements 308, 310, 312 can include a respective synchronizer 326, 328, and 330. The second set of processing elements 314, 316, and 318 can include a respective synchronizer 332, 334, and 336. The third set of processing elements 320, 322, and 324 can include a respective synchronizer 338, 340, and 342. While the example of FIG. 3 illustrates the processing element zones 302, 304, and 306 with three respective process elements, in other examples, more or less than three (3) processing elements can be used in a respective processing element zone.

In some examples, the system 300 can include a sync signal generator 340. The sync signal generator 340 can be configured similar to the sync signal generator 108, as shown in FIG. 1. The sync signal generator 344 and the synchronizers 326, 328, 330, 332, 334, 336, 338, 340, and 324 can define or form a synchronization system. By way of further example, each processing element zone 302, 304 and 306, can be configured to receive a respective synchronization signal 346, 348, and 350 that can be generated by the sync signal generator 344. In some examples, each of the synchronizers 326, 328, 330, 332, 334, 336, 338, 340, and 324 can be configured to store a respective count value. The respective count value being stored at each respective synchronizer 326, 328, 330, 332, 334, 336, 338, 340, and 324 can be representative of a difference in time between a respective upstream synchronizer 326, 328, 332, 334, 338, and 340 receiving the respective synchronization signal 346, 348, and 350 and a respective downstream synchronizer 330, 336, and 342 that is located the farthest away from the sync signal generator 108 relative the respective upstream synchronizers receiving the respective synchronization signal 346, 348, and 350. The respective count value stored at each of the synchronizers 326, 328, 330, 332, 334, 336, 338, 340, and 324 can be determined in a same or similar manner as described herein.

Each set of synchronizers (e.g., a first set of synchronizers 326, 328, and 330, a second set of synchronizers 332, 334, and 336, and a third set of synchronizers 338, 340, and 342) in each respective processing element zone 302, 304 and 306 can be configured to count down from the respective counter value until another pre-set value or zero value is reached. Each set of synchronizers can be configured to cause (e.g., command) a respective processing element in each processing element zone 302, 304, and 306 to start a respective function or operation function at about a same time and other processing elements in a respective processing element zone 302, 304, and 306. Thus, actions of processing elements in respective processing element zones 302, 304, and 306 can be synchronized with one or more other processing elements to operate in sync to solve or handle a respective task.

Figure 4:
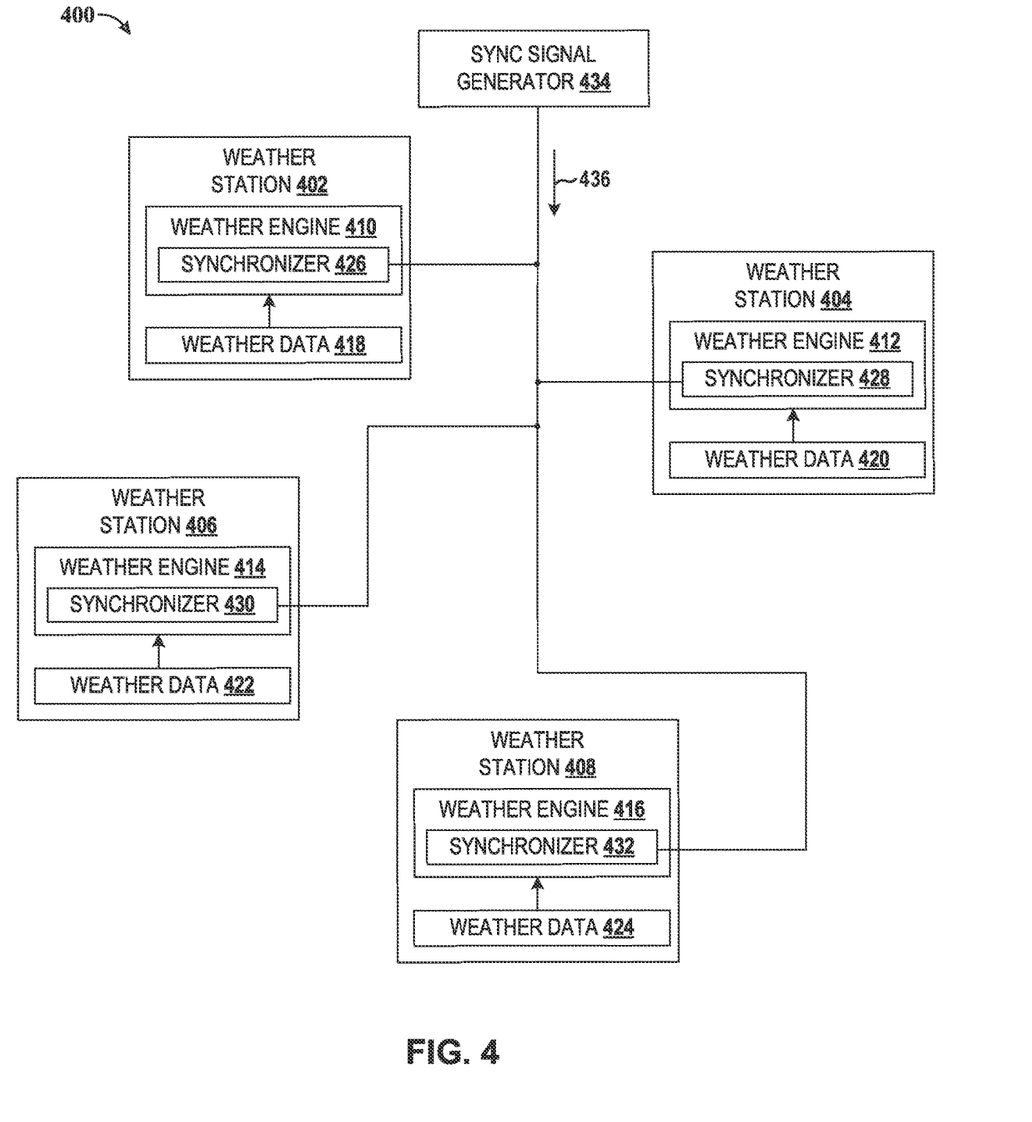
FIG. 4 is an example of a weather data processing system.

FIG. 4 is an example of a weather data processing system 400. The weather data processing system 400 can include a plurality of weather 402, 404, 406, and 408. The weather stations 402, 404, 406, and 408 may form a 3-D grid of weather reporting stations. While the example of FIG. 4 shows four (4) weather stations, in other examples more or less than four (4) weather stations can be employed. Each weather station 402, 404, 406, and 408 can employ a respective weather engine 410, 412, 414, and 416. In some examples, each weather engine 410, 412, 414, and 416 can include a specialized hardware accelerator for weather processing of respective weather data 418, 420, 422, and 424. Each weather engine 410, 412, 414, and 416 can be configured to receive the respective weather data 418, 420, 422, and 424 through serialized busses where the data is tagged with a station identifier. Once the data is loaded, synchronization can be used to get all of the processing aligned so that boundary conditions can be sent between weather stations 402, 404, 406, and 408 at a prescribed synchronous time. Once processing is complete, the results can be off-loaded serially, new data can be loaded and the process repeats.

For example, to synchronize actions of the weather engines 410, 412, 414, and 416, each of the engines can be configured with a synchronizer 426, 428, 430, and 432. Each of the synchronizers 426, 428, 430, and 432 can be configured to operate in a same or similar manner as one of the synchronizers 110, 112, and 114, as shown in FIG. 1, or the synchronizer 200, as shown in FIG. 2. Therefore, the following description of FIG. 4 can also refer to FIGS. 1-2. In some examples, a sync signal generator 434 can be employed for the synchronization of actions of the weather engines 410, 412, 414, and 416. The sync signal generator 434 can be configured similar to the sync signal generator 108, as shown in FIG. 1. The sync signal generator 434 can be configured to output a synchronization signal 436, which can be similar to the synchronization signal 116, as shown in FIG. 1. The sync signal generator 434 and the synchronizers 426, 428, 430, and 432 can define or form a synchronization system.

In some examples, each of the synchronizers 426, 428, 430, and 432 can be configured to store a respective count value. The respective count value being stored at each respective synchronizer 426, 428, 430, and 432 can be representative of a difference in time between a respective upstream synchronizer 426, 428, and 430 receiving the synchronization signal 436 and a downstream synchronizer 432 receiving the synchronization signal 436, which is located the farthest away from the sync signal generator 434 relative to the respective upstream synchronizer 426, 428, and 430. The respective count value stored at each of the synchronizers 426, 428, 430, and 432 can be determined in a same or similar manner as described herein.

The synchronizers 426, 428, 430, and 432 can be configured to count down from the respective counter value until another pre-set value or zero value is reached. The synchronizers 426, 428, 430, and 432 can be configured to cause (e.g., command) a respective weather engine 410, 412, 414, and 416 to start a respective function or operation function at about a same time as other weather engines. Thus, actions of a respective weather engine 410, 412, 414, and 416 can be synchronized other weather engines 410, 412, 414, and 416, and thus operate in sync to solve or handle a respective weather task.

Figure 5:
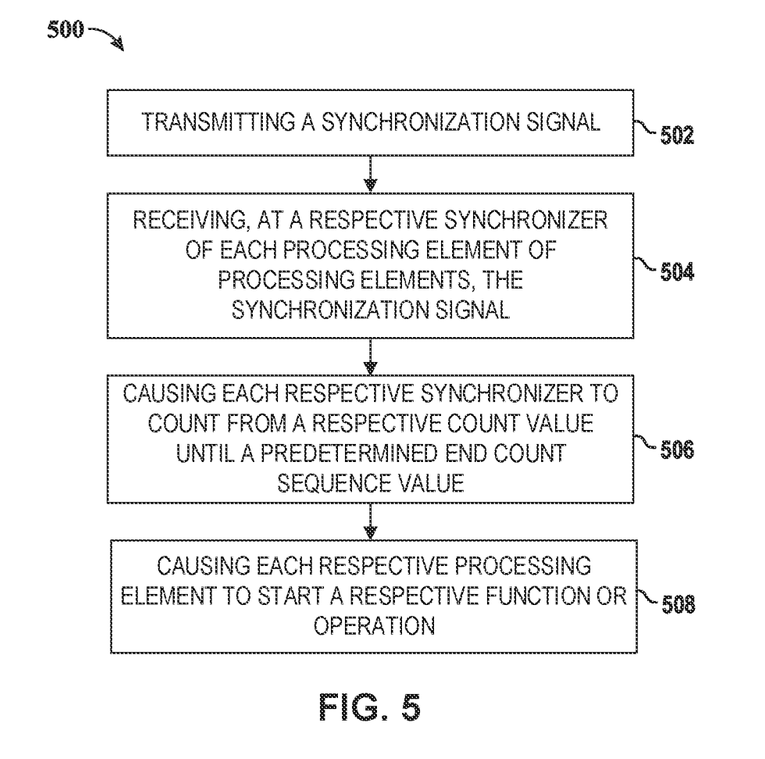
FIG. 5 is an example of a method of synchronizing processing elements.

In view of the foregoing structural and functional features described above, an example method will be better appreciated with references to FIG. 5. While, for purposes of simplicity of explanation, the example method of FIG. 5 is shown and described as executing serially, it is to be understood and appreciated that the example method is not limited by the illustrated order, as some actions could in other examples occur in different orders, multiple times and/or concurrently from that shown and described herein.

FIG. 5 is an example of a method 500 for synchronizing processing elements, such as the processing elements 110, 112, and 114, as shown in FIG. 1. The method 500 can be implemented by the systems described herein. Therefore, the following description of FIG. 5 can also refer to FIGS. 1-4. The method 500 can begin at 502 by transmitting a synchronization signal (e.g., the synchronization signal 116, as shown in FIG. 1), which can be generated by a sync signal generator (e.g., the sync signal generator 108, as shown in FIG. 1). At 504, receiving, at a respective synchronizer of each processing element, the synchronization signal. The synchronization signal can arrive at each synchronizer at a different instance in time since being transmitted.

At 506, causing each respective synchronizer to count from a respective count value (e.g., the count value 212, as shown in FIG. 2) until a predetermined end count sequence value in response to receiving the synchronization signal. Each respective synchronizer can be configured to store the count value (e.g., in a counter, such as the counter 210, as shown in FIG. 2). The respective count value being stored at each respective synchronizer can be representative of a difference in time between a respective upstream synchronizer receiving the synchronization signal and a downstream synchronizer that is located the farthest away from the sync signal generator in comparison to the respective upstream synchronizer. At 508, causing each respective processing element to start a respective function or operation in response to a corresponding synchronizer reaching the predetermined end count sequence value. Each respective processing element can be configured to start the respective function or operation at about a similar instance in time.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
    transmitting a synchronization signal to a plurality of synchronizers, wherein the plurality of synchronizers include a plurality of upstream synchronizers and a downstream synchronizer;
    causing each synchronizer of the plurality of upstream synchronizers to count from a respective count value until a predetermined end count sequence value in response to receiving the synchronization signal, the respective count value being stored at each synchronizer and being representative of a difference in time between a respective upstream synchronizer of the plurality of upstream synchronizers receiving the synchronization signal and the downstream synchronizer receiving the synchronization signal; and
    causing a respective processing element of a plurality of processing elements to start a respective function or operation in response to a respective upstream synchronizer reaching the predetermined end count sequence value.

2. The method of claim 1, wherein the synchronization signal arrives at each synchronizer of the plurality of synchronizers at a different instance in time since being transmitted.

3. The method of claim 2, wherein each respective processing element is configured to start the respective function or operation at about a similar instance in time.

4. The method of claim 3, wherein the synchronization signal is generated by a sync signal generator, and the downstream synchronizer is located a farthest away from the sync signal generator in comparison to the plurality of upstream synchronizers.

5. The method of claim 4, wherein each synchronizer of the plurality of synchronizers include a counter storing the respective count value, and the causing each synchronizer of the plurality of upstream synchronizers to count from the respective count value until the predetermined end count sequence value comprises initiating the counter to count from the respective count value to the predetermined end count sequence value.

6. The method of claim 4, wherein the plurality of upstream synchronizers include a first upstream synchronizer and a second upstream synchronizer, and the plurality of processing elements includes a first processing element that includes the first upstream synchronizer and a second processing element that includes the second upstream synchronizer.

7. The method of claim 6, wherein the first upstream synchronizer is configured to store a first count value representative of a difference in time between the first upstream synchronizer receiving the synchronization signal and the downstream synchronizer receiving the synchronization signal, and wherein the second upstream synchronizer is configured to store a second count value representative of a difference in time between the second upstream synchronizer receiving the synchronization signal and the downstream synchronizer receiving the synchronization signal.

8. The method of claim 7, further comprising:
causing the first upstream synchronizer to count down or up from the first count value until the predetermined end count sequence value; and
causing the first processing element to start the respective function or operation in response to the first upstream synchronizer reaching the predetermined end count sequence value.

9. The method of claim 8, further comprising:
causing the second upstream synchronizer to count down or up from the second count value until the predetermined end count sequence value; and
causing the second processing element to start the respective function or operation in response to the second upstream synchronizer reaching the predetermined end count sequence value.

10. The method of claim 9, wherein the first and second processing elements are configured to start the respective function or operation at about the similar instance in time.

11. The method of claim 10, wherein the plurality of processing elements include a third processing element that includes the downstream synchronizer, the downstream synchronizer being configured to store a third count value corresponding to a value representative of the predetermined end count sequence.

12. The method of claim 11, further comprising:
causing the downstream synchronizer to count down or up from the third count value until the predetermined end count sequence value; and
causing the third processing element to start the respective function or operation in response to the downstream synchronizer reaching the predetermined end count sequence value, wherein the third processing element is configured to start the respective function or operation at about the similar instance in time as the first and second processing elements.

13. A system comprising:
a sync signal generator configured to generate and transmit a synchronization signal for synchronization of a plurality of processing elements; and
a plurality of synchronizers, wherein each processing element of the plurality of processing elements includes a respective synchronizer of the plurality of synchronizers, each of the plurality of synchronizers being configured to count from different count values until a predetermined end count sequence value in response to receiving the synchronization signal, the plurality of synchronizers being configured to cause respective processing elements of the plurality of processing elements to start a respective function or operation in response to a respective synchronizer reaching the predetermined end count sequence value, the plurality of synchronizers include first and second upstream synchronizers and a downstream synchronizer, and wherein the different count values include a first count value and a second count value, the first count value being representative of a difference in time between the first upstream synchronizer receiving the synchronization signal and the downstream synchronizer receiving the synchronization signal, and the second count value being representative of a difference in time between the second upstream synchronizer receiving the synchronization signal and the downstream synchronizer receiving the synchronization signal.

14. The system of claim 13, wherein the downstream synchronizer is configured to count from a third count value until the predetermined end count sequence value in response to receiving the synchronization signal, the downstream synchronizer being configured to cause a third processing element of the plurality of processing elements to start a respective function or operation in response to the downstream synchronizer reaching the predetermined end count sequence value.

15. The system of claim 14, wherein the synchronization signal arrives at each of the first and second upstream synchronizers and the downstream synchronizer at a different instance in time since being transmitted by the sync signal generator, and wherein each of the first, second, and third processing elements are configured to start the respective function or operation at about a similar instance in time.

16. The system of claim 15, wherein each of the first and second upstream synchronizers and the downstream synchronizer comprise synchronizer logic and a counter, the synchronizer logic being configured to initiate the counter to count down or up from a respective count value until the predetermined end count sequence value, and the counter being configured to output a count reached signal in response to reaching the predetermined end count sequence value.

17. The system of claim 16, wherein the synchronizer logic is configured to output an activation signal in response to receiving the count reached signal, the activation signal being provided to a controller of a respective processing element to start the respective function or operation.

18. A system comprising:
a sync signal generator configured to generate and transmit a synchronization signal for synchronization of processing elements;
a plurality of sets of synchronizers, wherein each respective synchronizer of each set of synchronizers is part of a processing element of a plurality of processing elements, the plurality of processing elements comprising sets of processing elements that arranged to form a respective processing element zone, wherein a given set of synchronizers of the plurality of synchronizers include a plurality of upstream synchronizers and a downstream synchronizer, and
wherein each respective synchronizer is configured to count from a different count value than other synchronizers until a predetermined end count sequence value in response to receiving the synchronization signal, and cause a corresponding processing element that includes the respective synchronizer to start a respective function or operation in response to the respective synchronizer reaching the predetermined end count sequence value, the respective count value for each synchronizer in the given set of synchronizers being representative of a difference in time between a respective upstream synchronizer of the given set of synchronizers receiving the synchronization signal and the downstream synchronizer of the given set of synchronizers receiving the synchronization signal.

19. The system of claim 18, wherein the synchronization signal arrives at each synchronizer at a different instance in time since being transmitted by the sync signal generator.

* * * * *